(No Model.)

T. W. GREEN.
ROTARY BLOWER.

No. 588,329.  Patented Aug. 17, 1897.

UNITED STATES PATENT OFFICE.

THOMAS WILBRAHAN GREEN, OF PHILADELPHIA, PENNSYLVANIA.

ROTARY BLOWER.

SPECIFICATION forming part of Letters Patent No. 588,329, dated August 17, 1897.

Application filed December 28, 1896. Serial No. 617,167. (No model.)

*To all whom it may concern:*

Be it known that I, THOMAS WILBRAHAN GREEN, a citizen of the United States, residing at Philadelphia, in the county of Philadelphia and State of Pennsylvania, have invented certain new and useful Improvements in Rotary Blowers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that class of rotary blowers that is used for pumping gas and similar fluids that have combined with them tar or other material that will be precipitated in the pipes and upon the surfaces of the impellers of the blower and thus interfere with the nice adjustment and easy working of said impellers.

The object of my improvement is to prevent the tar precipitate from passing into the blower and also keep it from entering the main pipes through which the gas is conveyed. To accomplish the desired result, I construct immediately in front of the inlet to the blower traps or reservoirs that will catch the precipitate before it enters the blower.

Figure 1:
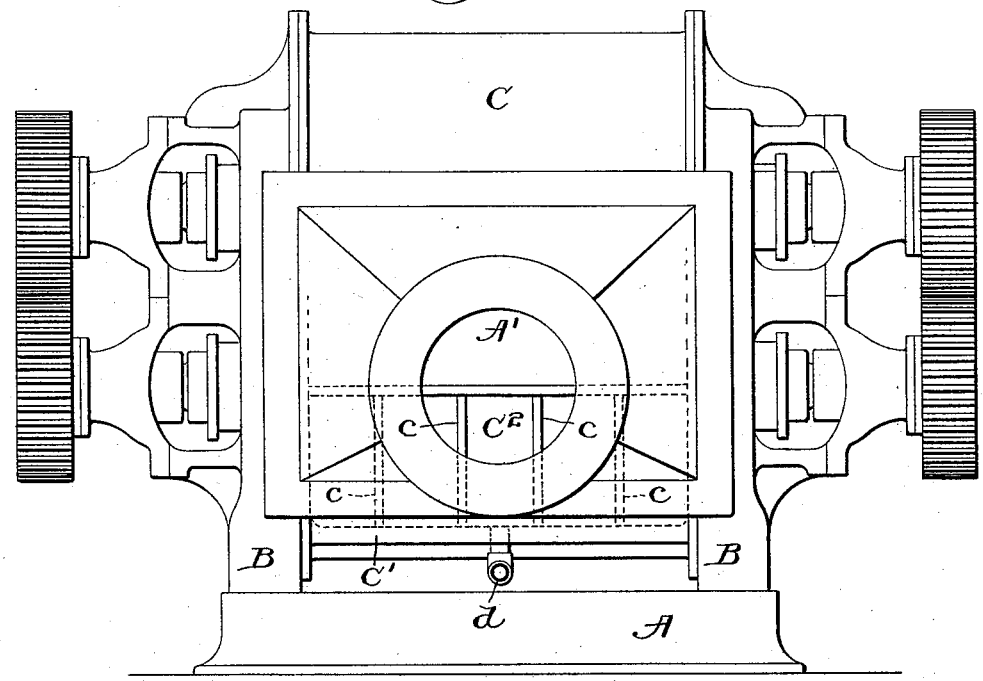
Figure 2:
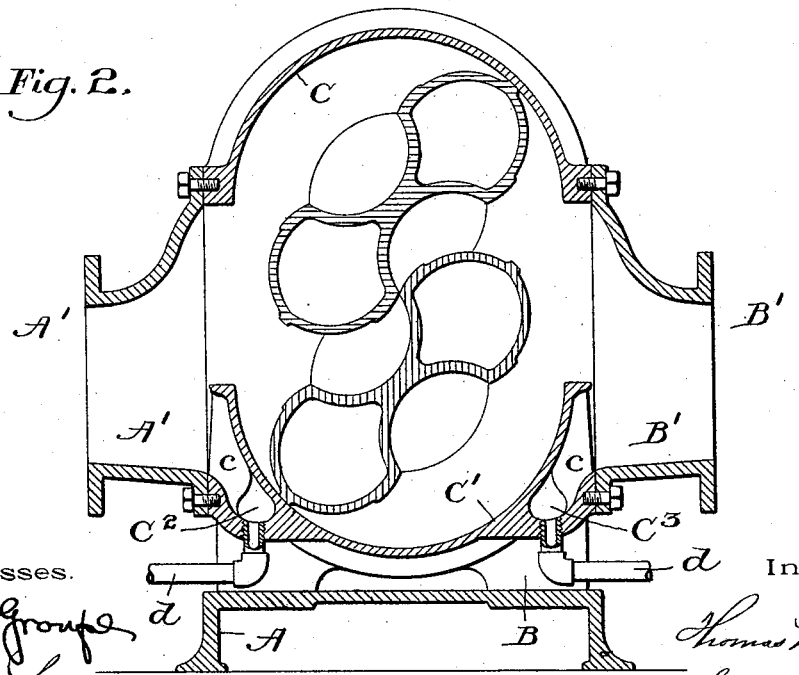

In the accompanying drawings, Figure 1 represents an end view of a rotary blower having my improvement therein. Fig. 2 is a cross-section of a blower, showing tar-traps in both the inlet and the discharge of the blower.

A represents the bed-plate of the blower; B, the end castings forming the supports for the driving-shafts; C, the upper half of the external casing surrounding the impellers of the blower; C', the lower half of the external casing; A', the inlet-pipe; B', the outlet or discharge pipe.

$C^2$ and $C^3$ are the tar traps or reservoirs cast on the outside of the lower casing C' immediately adjacent to the inlet and outlet of the blower.

$c\ c\ c$ are vertical supporting-ribs cast in the tar-traps for the purpose of strengthening the construction.

$d\ d$ are pipes connected to the bottom of the traps to carry off any material collected in said traps. These pipes may be connected directly with a receptacle for receiving the tar or they may be provided with stop-cocks and the tar drawn off from time to time.

As the bottom of the inlet-pipe A is below the inlet to the blower any heavy precipitate in the material being pumped will flow along the bottom of the pipe and enter the trap $C^2$ immediately in front of the blower. As a further precaution to prevent the tar or other precipitate from entering the blower the lower half C' of the external casing extends a considerable distance above the bottom of the tarry inlet. Should any of the tarry precipitate pass into and through the blower it will be caught in the second trap $C^3$ at the discharge, and will thus be prevented from passing into the main pipes.

Having thus described my invention, what I claim as new, and desire to secure by Letters Patent of the United States, is—

1. A rotary blower having a tar trap or reservoir in the inlet thereof, said trap or reservoir being located outside of the casing surrounding the blower-impellers and below the intake or opening in the said surrounding casing, substantially as shown.

2. In a rotary blower the combination of the outer casing C and C', surrounding the impellers, with the inlet-pipe A', having therein the tar-trap $C^2$, located below the inlet-pipe and below the intake in the outer casing C and C', of the blower, substantially as shown.

3. In a rotary blower or pump a tar trap or reservoir located in the main outlet-pipe below the bottom thereof and also below and to the outside of the discharge-opening of the blower, as set forth.

4. In a rotary blower or pump a trap or reservoir located in the inlet-pipe between the source of supply and the intake of the pump and below the level of said intake, for the purpose of receiving and holding the tarry precipitates and prevent them passing into the blower, as set forth.

In testimony whereof I affix my signature in presence of two witnesses.

THOMAS WILBRAHAN GREEN.

Witnesses:
THOS. D. MOWLDS,
SAML. H. KIRKPATRICK.